(12) United States Patent
Lovatt et al.

(10) Patent No.: US 6,291,953 B1
(45) Date of Patent: Sep. 18, 2001

(54) ELECTRICAL DRIVE SYSTEM

(75) Inventors: Howard C. Lovatt, West Lindfield; John Dunlop, Artarmon, both of (AU)

(73) Assignee: Commonwealth Scientific and Industrial Research Organization, Campbell (AU)

( * ) Notice: Subject to any disclaimer, the term of this patent is extended or adjusted under 35 U.S.C. 154(b) by 0 days.

(21) Appl. No.: 09/427,207

(22) Filed: Oct. 26, 1999

(30) Foreign Application Priority Data

| Oct. 27, 1998 | (AU) | ................................................. PP 6754 |
| Oct. 25, 1999 | (AU) | ................................................. PQ 3633 |
| Oct. 25, 1999 | (AU) | ................................................. PQ 3634 |

(51) Int. Cl.$^7$ ....................................................... H02P 7/00
(52) U.S. Cl. ............................................. 318/434; 180/65.1
(58) Field of Search .................................... 318/139, 434, 318/587, 9, 11, 12, 13; 180/65.2, 357, 65.1

(56) References Cited

U.S. PATENT DOCUMENTS

| 3,424,261 | * | 1/1969 | Sheldon .................................. 180/70 |
| 3,915,251 | | 10/1975 | Kassekert et al. ................. 180/65 R |
| 4,506,752 | * | 3/1985 | Hara et al. ........................... 180/179 |
| 5,117,931 | * | 6/1992 | Nishida ................................ 180/65.2 |
| 5,129,870 | * | 7/1992 | Pierce ................................... 475/285 |
| 5,376,869 | * | 12/1994 | Konrad ................................ 318/587 |
| 5,428,274 | * | 6/1995 | Furutani et al. ...................... 318/139 |

FOREIGN PATENT DOCUMENTS

| 43 42 735 | 6/1995 | (DE) . |
| 781 680 | 7/1997 | (EP) . |
| 838613 | 4/1998 | (EP) . |
| 81/00833 | 4/1981 | (WO) . |

* cited by examiner

*Primary Examiner*—Robert E. Nappi
*Assistant Examiner*—Rina I. Duda
(74) *Attorney, Agent, or Firm*—Kenyon & Kenyon

(57) ABSTRACT

The invention is directed generally toward an electrical drive system (1) for a load in the form of the driven wheels (2,3) of a vehicle (4). System (1)includes an electrical machine (5) for rotating a drive shaft (6) at a first speed. An output shaft (7) connects to wheels (2,3) and is responsible to shaft (6) for rotation at a second speed. A coupling in the form of a lock up torque converter coupling (8) is disposed between shaft (6) and shaft (7) and selectively operates in either a locked or an unlocked configuration whereby in the locked configuration the first speed equals the second speed and in the unlocked configuration the first speed is greater than the second speed.

9 Claims, 4 Drawing Sheets

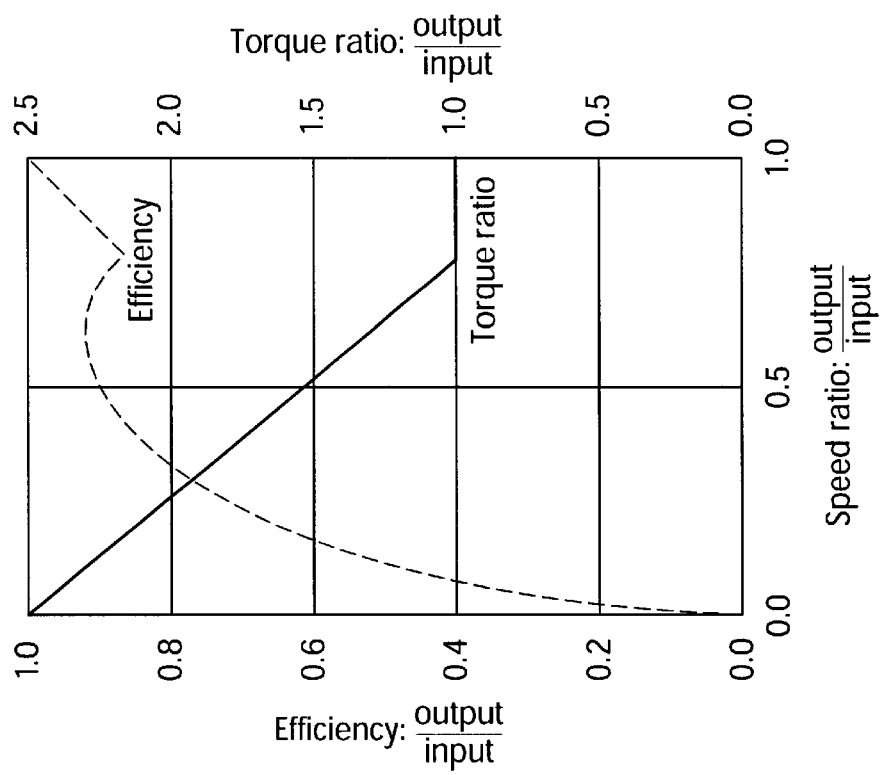
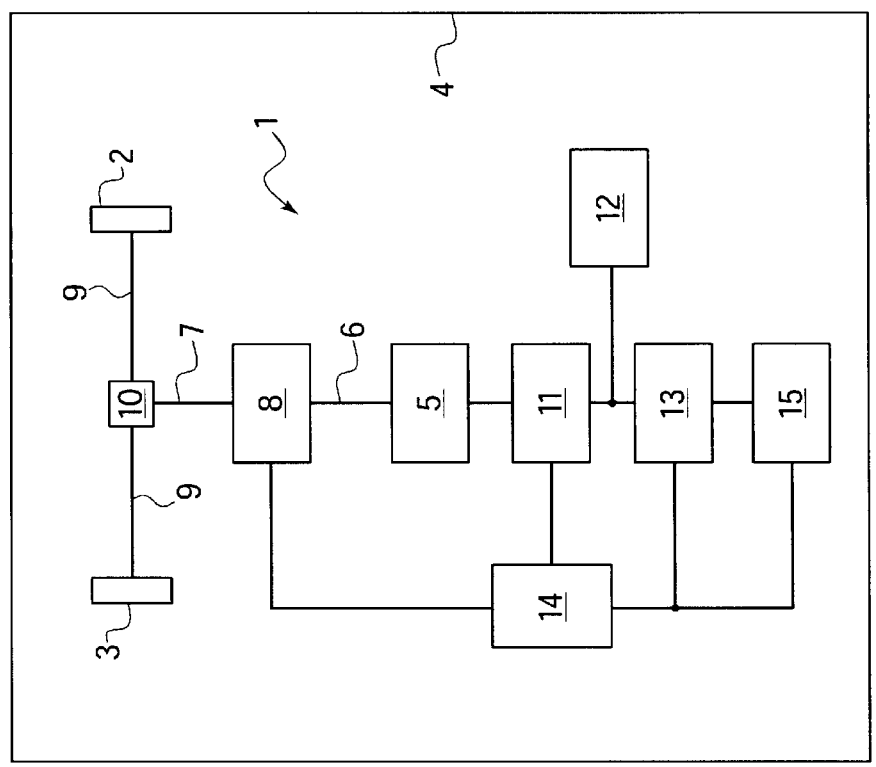
FIG. 2
FIG. 1

ELECTRICAL DRIVE SYSTEM

The present invention relates to a drive system and in particular to an electrical drive system.

The invention has been developed primarily for use within hybrid electric vehicles (HEVs) or electrically powered vehicles and will be described hereinafter with reference to that application. However, it will be appreciated that the invention is not limited to that particular field of use and is also applicable to other electrical drive applications having a variable load characteristic.

It is a conventional approach to provide a vehicle such as a car, bus or truck with an internal combustion (IC) engine. Due to a variety of concerns with this form of locomotion, particularly that of pollution, the development of alternative power sources has been encouraged. One of these alternatives is a HEV which includes a combination of an electrical machine and an IC engine. Such a combination promises numerous advantages such as:

1. recovering some of the energy used for acceleration when braking;
2. turning the IC engine off in areas particularly susceptible or prone to pollution or when stationary as the electrical system is still available to propel the vehicle (although this is contingent upon the vehicle having sufficient on-board energy storage);
3. allowing the use of a smaller IC engine; and
4. allowing the IC engine to be run more efficiently.

Other possible HEV configurations include: replacing the IC engine with a high-speed turbine or a fuel cell or combining an engine/turbine/fuel cell and a steam turbine which recovers some of the tail pipe energy.

The power required to propel a vehicle varies greatly over short time periods. Typical analysis of power requirements show that peak power is only required under extreme conditions such as: when accelerating hard; when the vehicle is traveling at its maximum velocity; or when climbing a steep gradient. Accordingly, when use is made of an IC engine, that engine is oversized for normal running, such as freeway cruising or an urban cycle, to cater for far more time limited events such as climbing steep hills and/or accelerating. The larger the engine the more fuel it burns for a given power because of increased friction. Hence, from an economy view point reducing the engine size is preferred. This is effectively achieved in a HEV by obtaining the extra peak power required for acceleration from the associated electrical system. The IC engine is only required to provide the average power.

Additionally, an IC engine has a relatively peaky efficiency characteristic compared to an electrical machine and is most effectively run at its most efficient operating point. In this type of scheme the IC engine is:

1. only turned on when required;
2. run always at its most efficient operating point (that is, it is only run at a fixed power and hence fixed speed and fixed torque); and
3. any excess energy generated above that required by the car at that time is collected and stored.

A compromise approach is to allow the IC engine to run at different powers, but for a given power run at its optimum speed and torque for this power. This reduces the amount of storage required and is done with conventional cars fitted continuously variable gearboxes.

A second compromise approach is run the engine at a speed dictated by the vehicle speed and the gear that the vehicle is in, but to operate it at its most efficient torque. The excess power is stored for later use.

Other alternatives are to replace the internal combustion engine with a high-speed turbine. Such a turbine is subject to considerably less frictional losses and is much more efficient than an IC engine. It also generally operates at higher temperatures, which again improve its efficiency. Moreover, turbines are smaller and lighter than the equivalent IC engine. Small turbines producing up to about 20 kW are common in aircraft where they provide auxiliary power to the aircraft when stationary on the tarmac. This power is used both to start the main engines and to power internal systems on the aircraft. Turbines specifically designed for hybrid vehicles are also available.

The most radical approach to HEVs is to replace any form of mechanical conversion of fuel to energy with a fuel cell. Much attention, particularly in the USA, has been given to fuel cells for cars. However, there are no vehicles powered by fuel cells commercially available as many specific difficulties associated with this technology are yet to be sufficiently addressed.

In another alternative form HEV the waste heat from the engines, whether that be an IC engine, turbine or fuel cell, is used to heat water and turn it into steam. This steam drives a turbine, which, in turn, drives a generator that charges an on-board energy store.

Most HEVs rely upon an electrical machine of some kind, although in combination with one or more alternative power sources. Accordingly, sophisticated electronic control circuitry is required to ensure an effective interface between the electrical machine and the other power source. This leads to an inherent compromise involved in the choice of the electrical machine and control electronics. More particularly, the cost of an electrical machine or generator is approximately proportional to its torque, whereas the cost of the control electronics is approximately proportional to the VA required to drive the electrical machine.

It is an object of the present invention, at least in the preferred embodiments, to overcome or substantially ameliorate one or more of the disadvantages of the prior art, or at least to provide a useful alternative.

According to a first aspect of the invention there is provided an electrical drive system for a load, the system including:

an electrical machine for rotating a drive shaft at a first speed;

an output shaft for connecting to the load and which is responsive to the drive shaft for rotation at a second speed; and a coupling between the drive shaft and the output shaft which selectively operates in either a locked or and unlocked configuration, whereby in the locked configuration the first speed equals the second speed and in the unlocked configuration the first speed is greater than the second speed.

Preferably, the electrical machine applies to a first torque to the drive shaft and the coupling applies a second torque to the output shaft wherein, in the unlocked configuration, the second torque is greater than the first torque. More preferably, in the locked configuration the first torque is equal to the second torque.

Preferably also, the coupling is a lockup torque converter. More preferably the coupling is a viscous converter.

In a preferred form, the coupling is responsive to an operator's input for varying the second torque. More preferably, during that variation of the second torque the first torque remains substantially constant. Even more preferably, the magnitude of the second torque is required to fall within the range of between 0 and a maximum load torque and the magnitude of the first torque is required to fall within a range between 0 and a maximum drive torque, wherein the maximum load torque is greater than the maximum drive torque.

Preferably, the system includes a control means, which is responsive to an operator's input for controlling both the electrical machine and the coupling such that the first torque is substantially constant.

Preferably also, the system is mounted to a vehicle having at least one driven wheel and the load is that one or more driven wheel. More preferably, the operator provides various inputs to drive the vehicle and the controller is responsive to at least one of those inputs for accelerating the vehicle, whereby acceleration up to a threshold is achieved by a corresponding increase in both the first and the second torques, while acceleration above that threshold is achieved by a larger increase in the second torque. Even more preferably, following an input being provided to accelerate the vehicle above the threshold, and is absence of subsequent like inputs, the controller progressively reduces the first speed to equal the second speed.

According to a second aspect of the invention there is provided a method for electrically driving a load, the method including the steps of:

rotating a drive shaft at a first speed with an electrical machine;

providing an output shaft for connecting to the load the output shaft being responsive to the drive shaft for rotation at a second speed; and selectively coupling the drive shaft and the output shaft in either a locked or an unlocked configuration, whereby in the locked configuration the first speed equals the second speed and in the unlocked configuration the first speed is greater than the second speed.

Preferably, the method also includes the steps of applying a first torque to the drive shaft with the electrical machine and coupling selectively the drive shaft and the output shaft such that a second torque is applied to the output shaft wherein, in the unlocked configuration, the second torque is greater than the first torque. More preferably, in the locked configuration the first torque is equal to the second torque.

Preferably also, the method includes the step of selectively coupling the drive shaft and the output shaft with the lockup torque converter. More preferably the coupling is achieved with a viscous torque converter.

Preferred embodiments of the invention will now be described, by way of example only, with reference to the accompanying drawings, in which:

FIG. 1 is a schematic representation of an electrical drive system according to the invention;

FIG. 2 is a plot of the efficiency and torque ration for the lock up torque converter included in FIG. 1;

Figure 3:
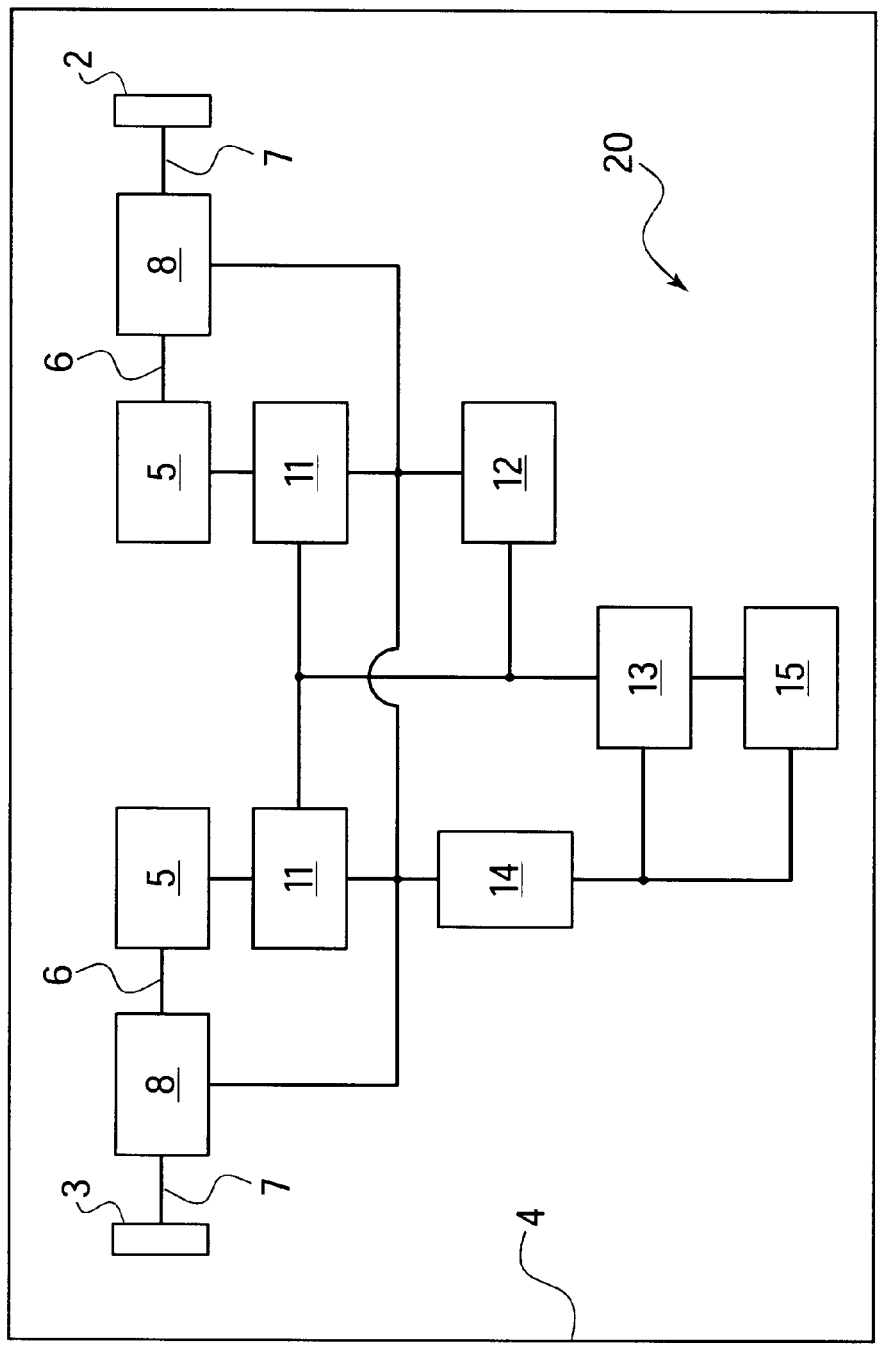
FIG. 3 is a schematic representation of an alternative electrical drive system according to the invention.

Referring in particular to FIG. 1, there is illustrated an electrical drive system 1 for a load in the form of the driven wheels 2 and 3 of a vehicle 4. System 1 includes an electrical machine 5 for rotating a drive shaft 6 at a first speed. An output shaft 7 connects to wheels 2 and 3 and is responsive to shaft 6 for rotation at a second speed. A coupling in the form of a lock up torque converter coupling 8 is disposed between shaft 6 and shaft 7 and selectively operates in either a locked or an unlocked configuration whereby in the locked configuration the first speed equals the second speed and in the unlocked configuration the first speed is greater than the second speed.

Wheels 2 and 3 are rotatably mounted to respective axles 9, which are driven from shaft 7 via a differential 10.

Electrical machine 5 is interfaced by electronic circuitry 11 with two power supplies in the form of batteries 12 and a generator 13. It will be appreciated that batteries 12 in some embodiments include other forms of energy storage devices such as super-capacitors or a combination of energy storage devices. In any event, circuitry 11 and coupling 8 are responsive to a controller 14 for propelling vehicle 4 in a manner directed by inputs from an operator (not shown).

System 1 includes an internal combustion engine 15, which drives a shaft 16 which is also the rotor shaft of generator 13. As would be appreciated by those skilled in the art, engine 15 is selectively operated, in this embodiment by controller 14, to drive generator 13. As will also be appreciated, generated 13 selectively supplies energy directly to electrical machine 5 or indirectly through recharging batteries 12.

Under steady state operating conditions the first speed is substantially constant and a substantially constant current is being supplied to electrical machine 5 by circuitry 11. Moreover, under these conditions coupling 8 is in the locked configuration and, as such, the first speed equals the second speed.

For convenience, the torque applied to shaft 6 and shaft 7 will be respectively referred to as the first torque and the second torque. Under steady state operating conditions the first torque and the second torque will be equal.

In response, say, to input from the operator requesting an acceleration of vehicle 4, controller 14 first determines whether that acceleration is above a predetermined threshold. If not, then the controller 14 leaves coupling 8 in the locked configuration while ensuring additional current is provided to electrical machine 5 sufficient to increase the first torque, and consequently the second torque, to affect the desired acceleration. However, if the requested acceleration is above the predetermined threshold, controller 14 will move coupling 8 from the locked configuration into the unlocked configuration. Thereafter, controller 14 will affect an increase in the first speed through a corresponding increase in the current being supplied to the windings of electrical machine 5. Simultaneously, the degree of unlock provided by coupling 8 is controlled to increase the second torque sufficiently to provide the desired acceleration.

In this embodiment coupling 8 includes a characteristic as illustrated in FIG. 2. That is, coupling 8 allows a substantial torque multiplication to occur. Although the efficiency of coupling 8 generally decreases with increasing unlocking, this is not critical for HEVs and other applications where short term high torques are required. That is, coupling 8 is only moved from the locked configuration for relatively short periods of time, and otherwise is effectively 100% efficient.

Controller 14 also provides for regenerative braking.

System 1 allows electrical machine 5 to have a torque rating which is far less than the maximum value of the second torque. Accordingly, a smaller, lighter and less expensive electrical machine is used to provide the same first torque. In other embodiments, however, the same electrical machine is used in system 1 to provide improved acceleration for vehicle 4.

A further embodiment of the invention is illustrated is FIG. 3 where corresponding features are denoted by corresponding reference numerals. More particularly, an alternative electrical drive system 20 includes two separated electrical machines 5 for driving respective wheels 2 and 3. That is, no differential is required as the wheels are directly mounted to respective shafts 7. Electronic controllers 11 and associated couplings 8 are all responsive to controller 14.

Figure 4:
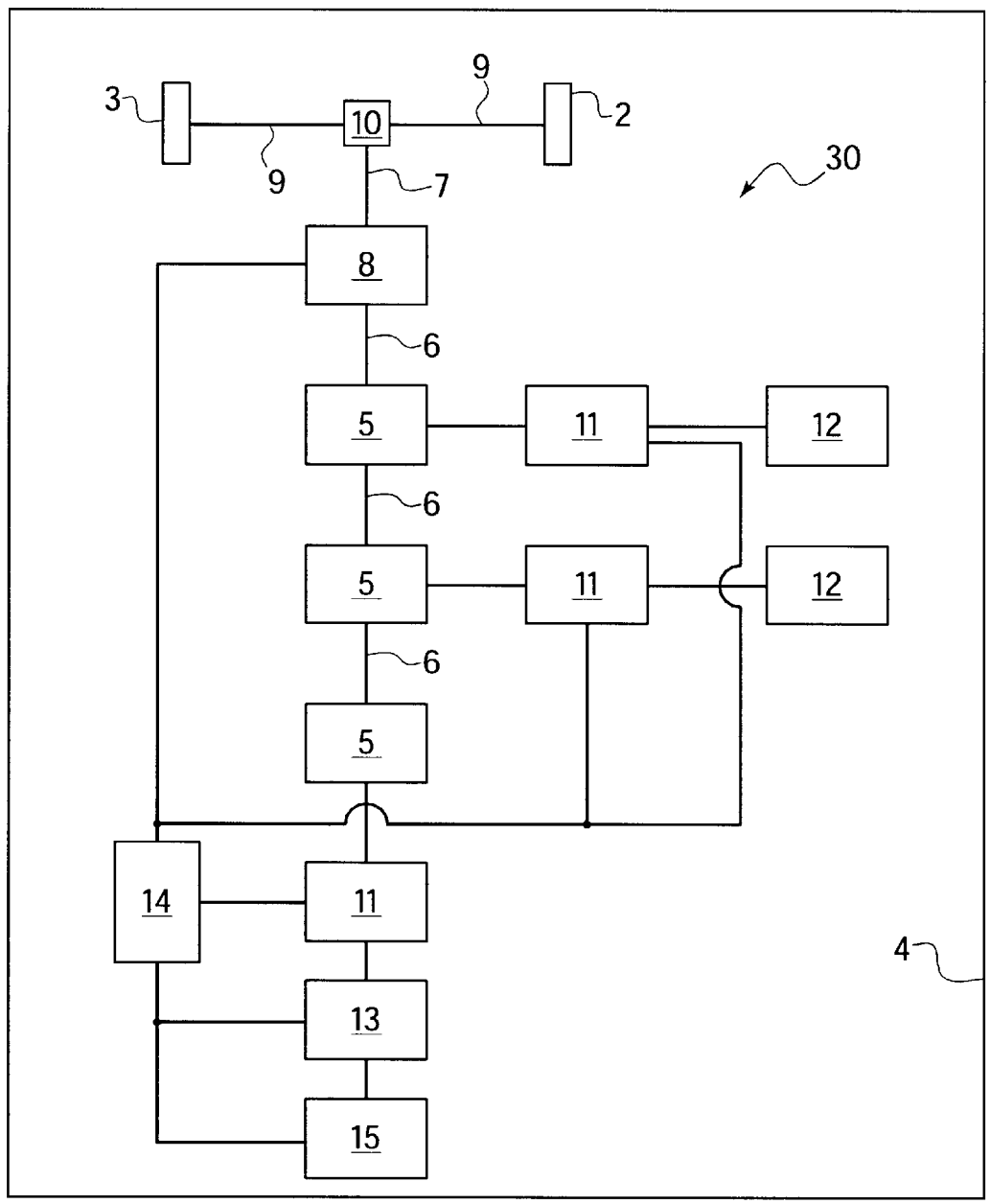
FIG. 4 is a schematic representation of another alternative electrical drive system according to the invention.

A further embodiment of the invention is illustrated schematically in FIG. 4 where corresponding features are denoted by corresponding reference numerals. More particularly, an electrical drive system 30 combines the features of the invention disclosed herein with that invention disclosed in the co-pending Australian Provisional Patent Application . . . that was filed on Oct. 25, 1999 and which is preceding in the name of the present assignee. The disclosure contained within that co-pending application is incorporated herein by way of cross reference.

System 30 includes three electrical machines 5 mounted on a common shaft 6. One electrical machine obtains its power from the generator 13 and the other two from energy storage items 12. In other embodiments system 30 includes other combinations of electrical machines and storage items. Moreover, in this embodiment items 12 are respectively comprised of a combination of batteries and super-capacitors. In other embodiments, however, items 12 both include more than one energy storage type.

As discussed above with reference to FIG. 1, electronic controllers 11 and coupling 8 are all responsive to controller 14.

Figure 5:
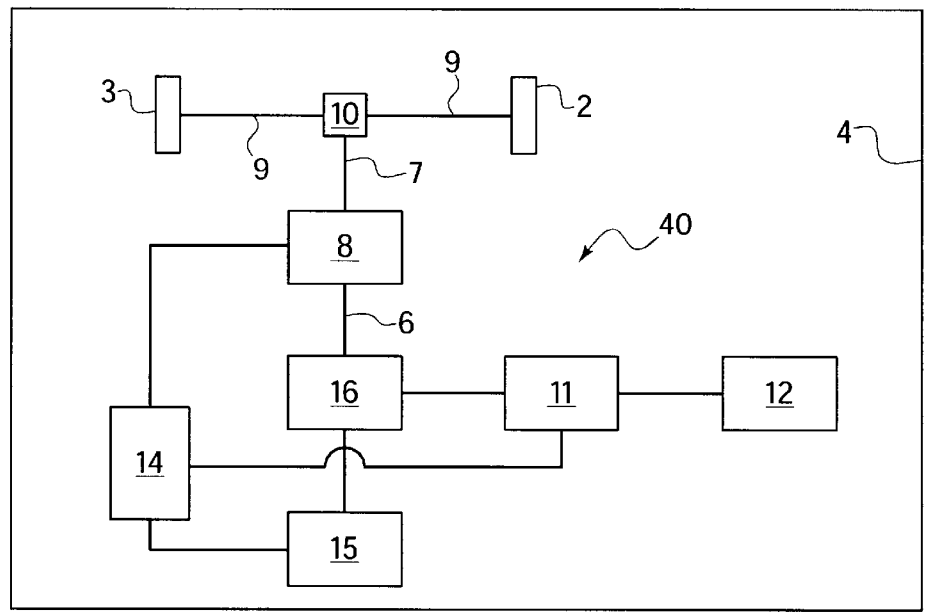
FIG. 5 is a schematic representation of a further alternative electrical drive system according to the invention.

A further embodiment of the invention is illustrated schematically in FIG. 5 where corresponding features are denoted by corresponding reference numerals. More particularly, an electrical drive system 40 combines the features of the invention disclosed herein with that invention disclosed in the co-pending Australian Provisional Patent Application . . . that was filed on Oct. 25, 1999 and which is preceding in the name of the present assignee. The disclosure in that co-pending application is incorporated herein by way of cross reference.

System 40 includes a combined electrical machine 16 that acts as both a generator and electrical machine and transfers energy from its input shaft to its output shaft without passing the energy through the electronic controller 11. Electronic controller 11 and coupling 8 are both responsive to controller 14.

Figure 6:
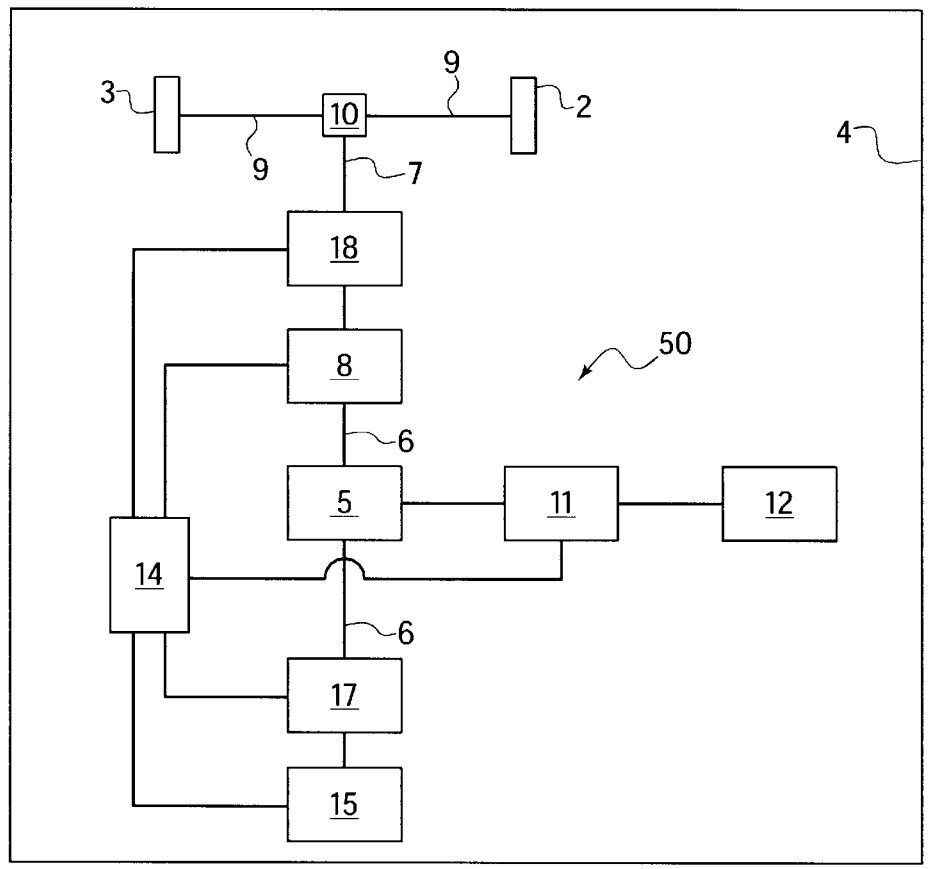
FIG. 6 is a schematic representation of a still further alternative electrical drive system according to the invention.

A further embodiment of the invention is illustrated schematically in FIG. 6 where corresponding features are denoted by corresponding reference numerals. More particularly, an alternative electrical drive system 50 uses a parallel hybrid arrangement, such that the IC engine 15 is directly connected to clutch 17 which in turn is directly connected to coupling 8 via a common shaft 6. In this embodiment system 50 includes a gearbox 18 as engine 15 is connected to coupling 8 when clutch 17 is closed. Electronic controller 11 and coupling 8 are both responsive to controller 14. In this embodiment gearbox 18 is also responsive to controller 14. However, in other embodiments gearbox 18 is not so controlled. Moreover, in still further embodiments gearbox 18 is omitted.

The invention also includes within its scope a combination of the specific embodiments described above. For example, in a first such embodiments system 30 is used in combination with system 50 to provide a parallel hybrid system. That is, multiple electrical machines are mounted on common shaft 6 and each machine connected to its own storage 12 via respective controllers 11.

The invention is similarly applicable to driving more or less than two wheels of the vehicle.

The embodiments described above allow a reduction in the torque required from the electrical machine without substantially changing the VA that is required from the electronic controller. Accordingly, a reduction in the overall cost of the system is achieved.

The invention is also suitable for non-vehicular applications. That is, fitting coupling 8 to the output of a machine allows the torque rating to be reduced. This is regardless of the intended application, the intended load, or the available power source.

Although the invention has been described with reference to specific examples, it will be appreciated by skilled in the art that is may be embodied in many other forms.

What is claimed is:

1. An electrical drive system for a load, the system including:
   an electrical machine to apply a first torque to a drive shaft for rotating the drive shaft at a first speed;
   an output shaft for connecting to the load and which is responsive to the drive shaft for rotation at a second speed; and
   a coupling between the drive shaft and the output shaft which selectively operates in either a locked or an unlocked configuration for applying a second torque to the output shaft whereby, in the locked configuration, the first speed equals the second speed and, in the unlocked configuration, the first speed is greater than the second speed and the second torque is greater than the first torque.

2. An electrical drive system for a load, the system including:
   an electrical machine to apply a first torque to a drive shaft for rotating the drive shaft at a first speed;
   an output shaft for connecting to the load and which is responsive to the drive shaft for rotation at a second speed; and
   a coupling between the drive shaft and the output shaft which selectively operates in either a locked or an unlocked configuration for applying a second torque to the output shaft whereby;
   in the locked configuration, the first speed equals the second speed and the first torque is equal to the second torque; and
   in the unlocked configuration, the first speed is greater than the second speed and the second torque is greater than the first torque.

3. An electrical drive system for a load, the system including:
   an electrical machine for rotating a drive shaft at a first speed;
   an output shaft for connecting to the load and which is responsive to the drive shaft for rotation at a second speed; and
   a lockup torque converter between the drive shaft and the output shaft which selectively operates in either a locked or an unlocked configuration, whereby in the locked configuration the first speed equals the second speed and in the unlocked configuration the first speed is greater than the second speed.

4. An electrical drive system for a load, the system including:
   an electrical machine to apply a first torque to a drive shaft for rotating the drive shaft at a first speed;
   an output speed for connecting to the load and which is responsive to the drive shaft for rotation at a second speed; and a coupling between the drive shaft and the output shaft which selectively operates in either a locked or an unlocked configuration for applying a second torque to the output shaft whereby, in the locked configuration, the first speed equals the second speed and, in the unlocked configuration, the first speed is greater than the second speed and the second torque is greater than the first torque, the coupling being responsive to an operator's input for varying the second torque wherein, during that variation of the second torque, the first torque remains substantially constant.

5. An electrical drive system for a load, the system including:

an electrical machine for rotating a drive shaft at a first speed;

an output shaft for connecting to the load and which is responsive to the drive shaft for rotation at a second speed;

a coupling between the drive shaft and the output shaft which selectively operates in either a locked or an unlocked configuration, whereby in the locked configuration the first speed equals the second speed and in the unlocked configuration the first speed is greater than the second speed; and a controller which is responsive to an operator's input for controlling both the electrical machine and the coupling such that the first torque is substantially constant, wherein the operator provides various inputs to drive the vehicle and the controller is responsive to at least one of those inputs for accelerating the vehicle such that acceleration up to a threshold is achieved by a corresponding increase in both the first and the second torques, while acceleration above that threshold is achieved by a larger increase in the second torque.

6. A system according to claim 5 wherein, following an input being provided to accelerate the vehicle above the threshold, and in absence of subsequent like inputs, the controller progressively reduces the first speed to equal the second speed.

7. A method for electrically driving a load, the method including the steps of:

using an electrical machine to apply a first torque to a drive shaft for rotating the drive shaft at a first speed;

providing an output shaft for connecting to the load, the output shaft being responsive to the drive shaft for rotation at a second speed and for applying a second torque to the load; and selectively coupling the drive shaft and the output shaft in either a locked or an unlocked configuration, whereby in the locked configuration the first speed equals the second speed and in the unlocked configuration the first speed is greater than the second speed and the second torque is greater than the first torque.

8. A method according to claim 7 wherein, in the locked configuration, the first torque is equal to the second torque.

9. A method for electrically driving a load, the method including the steps of:

rotating a drive shaft at a first speed with an electrical machine;

providing an output shaft for connecting to the load the output shaft being responsive to the drive shaft for rotation at a second speed; and selectively coupling the drive shaft and the output shaft in either a locked or an unlocked configuration with a lockup torque converter, whereby in the locked configuration the first speed equals the second speed and in the unlocked configuration the first speed is greater than the second speed.

* * * * *